US008306024B2

(12) United States Patent
Fromm et al.

(10) Patent No.: US 8,306,024 B2
(45) Date of Patent: *Nov. 6, 2012

(54) PREVENTING FORWARDING OF A PACKET TO A CONTROL PLANE

(75) Inventors: Kelly Donald Fromm, Newman Lake, WA (US); Loren Douglas Larsen, Spokane Valley, WA (US); Michael John Chartier, Liberty Lake, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 517 days.

This patent is subject to a terminal disclaimer.

(21) Appl. No.: 12/646,877

(22) Filed: Dec. 23, 2009

(65) Prior Publication Data

US 2010/0098086 A1    Apr. 22, 2010

Related U.S. Application Data

(63) Continuation of application No. 11/565,466, filed on Nov. 30, 2006, now Pat. No. 7,653,057.

(51) Int. Cl.
*H04L 12/28* (2006.01)
*H04L 12/56* (2006.01)
(52) U.S. Cl. ......... 370/389; 370/392; 370/254; 370/252
(58) Field of Classification Search .................. 370/252, 370/254, 389, 392, 401, 352, 353
See application file for complete search history.

(56) References Cited

U.S. PATENT DOCUMENTS

| 4,929,939 | A  |   | 5/1990  | Varma et al.            |
|-----------|----|---|---------|-------------------------|
| 5,367,517 | A  |   | 11/1994 | Cidon et al.            |
| 6,956,861 | B2 |   | 10/2005 | Reed et al.             |
| 7,028,179 | B2 | * | 4/2006  | Anderson et al. 713/154 |
| 7,212,495 | B2 |   | 5/2007  | Karri et al.            |
| 7,280,478 | B2 |   | 10/2007 | Oh et al.               |
| 7,508,764 | B2 | * | 3/2009  | Back et al. 370/235     |
| 7,546,635 | B1 | * | 6/2009  | Krohn et al. 726/11     |
| 2004/0081180 | A1 |   | 4/2004  | De Silva et al.       |
| 2006/0193266 | A1 | * | 8/2006  | Siddha et al. 370/254 |
| 2006/0251065 | A1 |   | 11/2006 | Hamamoto et al.       |
| 2007/0058632 | A1 | * | 3/2007  | Back et al. 370/392   |
| 2007/0171814 | A1 |   | 7/2007  | Florit et al.         |
| 2008/0049621 | A1 | * | 2/2008  | McGuire et al. 370/236.2 |

* cited by examiner

*Primary Examiner* — Chuong T Ho

(74) *Attorney, Agent, or Firm* — Clements Bernard PLLC; Christopher L. Bernard; Lawrence A. Baratta, Jr.

(57) ABSTRACT

This invention includes tools that prevent forwarding of a packet to a control plane of a packet switch. The tools receive a packet comprising indicia suggesting that the packet be forwarded to a control plane of a packet switch. After receiving the packet, the tools may modify the packet to prevent the packet from being forwarded to the control plane, intercept the packet before it is received by the control plane, or otherwise prevent the packet from being forwarded to the control plane. The tools may also forward the packet from a source port of a packet switch to a destination port of the packet switch without forwarding the packet to the control plane of the packet switch.

13 Claims, 9 Drawing Sheets

PREVENTING FORWARDING OF A PACKET TO A CONTROL PLANE

RELATED APPLICATION DATA

This application is a continuation application of U.S. patent application Ser. No. 11/565,466 which was filed on Nov. 30, 2006 now U.S. Pat. No. 7,653,057, the entirety of which is incorporated herein by reference.

BACKGROUND OF THE INVENTION

Packet switches capable of receiving a packet, determining a destination port for the packet, and forwarding the packet to a destination port are the foundation of packet networks. In performing this function, packet switches generally do not examine in detail the contents of the packets they switch. Instead, packet switches typically learn just enough about a packet to enable the packet switch to forward the packet to the correct destination port(s).

Packet switches do examine some packets more closely, however. For example, a packet switch may receive a control frame addressed to the packet switch itself. The packet switch may fully examine the control frame and make behavior or configuration changes based on the contents of the control frame. Similarly, the packet switch may examine Internet Group Management Protocol (IGMP) packets in detail to monitor the state of one or more multicast groups accommodated by the packet switch. Once the packet switch has examined the contents of the IGMP packet, it may then forward the IGMP packet on to a destination port.

To examine a particular packet in detail, the packet switch typically sends the packet to a control plane portion of the packet switch. The control plane often comprises a microprocessor capable of examining the contents of the packet. Once the control plane has examined the packet in detail, if the packet is addressed to a device other than the packet switch itself, the control plane forwards the packet to a data plane portion of the packet switch. The data plane examines the packet, determines a destination port for the packet, and forwards the packet to the destination port.

Packet switches typically include a filter that determines on a packet-by-packet basis whether to forward a packet to the data plane or to the control plane. Conventional filters unnecessarily send some packets to the control plane that the packet switch does not need to examine in detail. For example, conventional filters send control frames associated with a network tunnel to the control plane. Since the control frames are associated with a network tunnel, the control plane does not act on them. Instead, the control plane identifies them as tunneled control frames and forwards them on to the data plane. Since the control plane examines packets in detail, packets handled by both the control plane and the data plane experience greater latency and jitter than packets handled only by the data plane.

SUMMARY OF THE INVENTION

This document describes tools that prevent forwarding of a packet to a control plane of a packet switch. The tools receive a packet comprising indicia suggesting that the packet be forwarded to a control plane of a packet switch. After receiving the packet, the tools may modify the packet to prevent the packet from being forwarded to the control plane, intercept the packet before it is received by the control plane, or otherwise prevent the packet from being forwarded to the control plane. The tools may also forward the packet from a source port of a packet switch to a destination port of the packet switch without forwarding the packet to the control plane of the packet switch.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The same numbers are used throughout the disclosure and figures to reference like components and features.

DETAILED DESCRIPTION OF THE PREFERRED EMBODIMENTS

Overview

The following document describes tools capable of preventing forwarding of a packet to a control plane of a packet switch. An environment in which the tools may enable these and other actions is set forth below in a section entitled Exemplary Operating Environment. This is followed by another section describing exemplary ways in which the tools may act to prevent a packet associated with a network tunnel from being forwarded to a control plane of a packet switch. This section is entitled Exemplary Embodiments for Preventing Forwarding of a Packet to a Control Plane. A final section describes these and other embodiments and manners in which the tools may act and is entitled Other Embodiments of the Tools. This overview, including these section titles and summaries, is provided for the reader's convenience and is not intended to limit the scope of the claims or the entitled sections.

Exemplary Operating Environment

Before describing the tools in detail, the following discussion of an exemplary operating environment is provided to assist the reader in understanding some ways in which various inventive aspects of the tools may be employed. The environment described below constitutes an example and is not intended to limit application of the tools to any one particular operating environment. Other environments may be used without departing from the spirit and scope of the claimed subject matter.

A common service provider business model involves deploying network infrastructure capable of connecting networks not owned by the service provider, such as enterprise networks operated by business enterprises. The service provider's network infrastructure forms a shared transport network that the service provider may use to provide transport services, such as network tunnels, to a variety of subscribers.

Each network tunnel provides connectivity between two or more devices connected to the transport network that are associated with the network tunnel. In addition, the network tunnel prevents connectivity via a particular network tunnel between devices not associated with the particular network tunnel and devices associated with the particular network tunnel.

Figure 1:
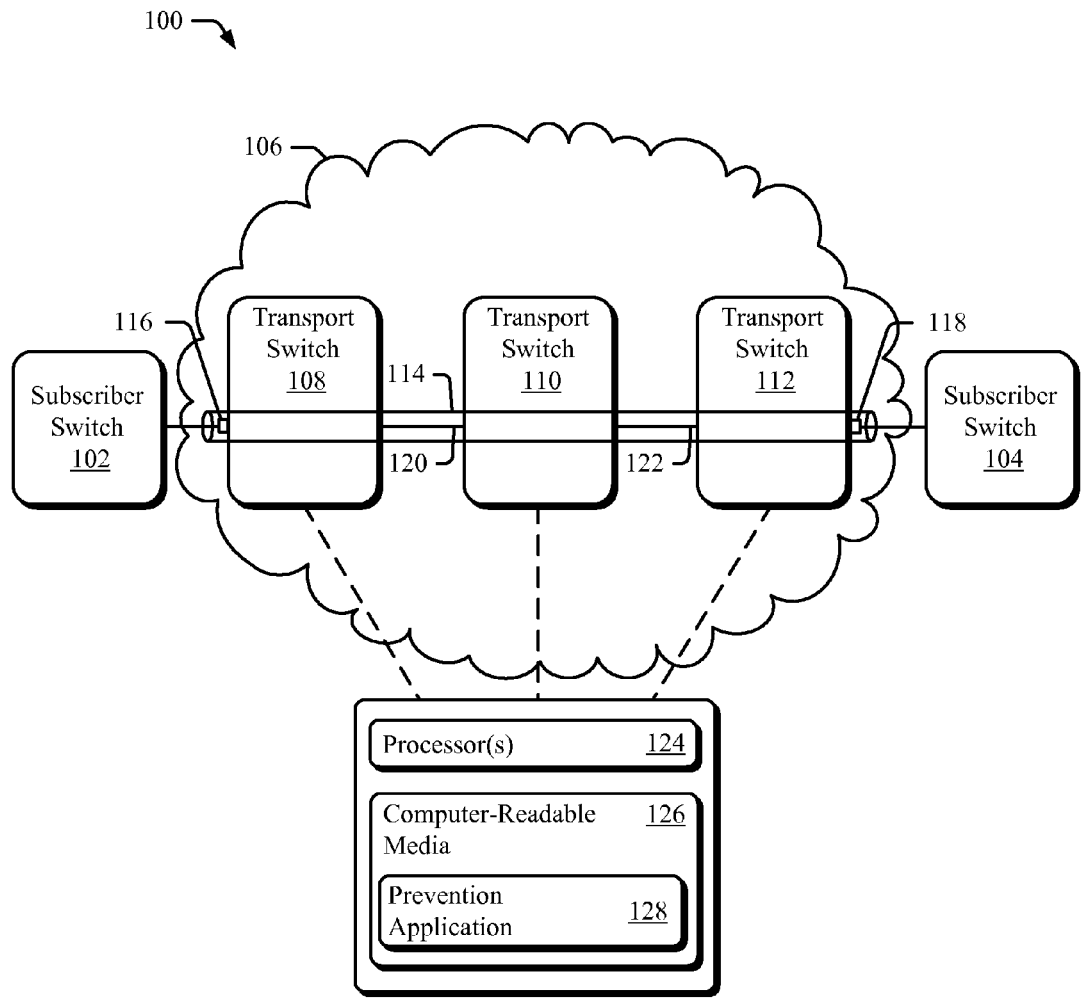
FIG. 1 illustrates an exemplary operating environment in which various embodiments of the tools may operate.

FIG. 1 illustrates an operating environment generally at 100 linking subscriber switches together via a network tunnel. The environment includes two subscriber switches 102, 104; a transport network 106 comprising three transport switches 108, 110, 112; links connecting the transport switches 120, 122; and a network tunnel 114.

The subscriber switches 102, 104 exchange packets with each other via the network tunnel 114. In this exemplary embodiment, the subscriber switches are associated with a single enterprise and are sited in physically different locations.

The transport network 106 provides connectivity between the two subscriber switches via the network tunnel. The transport network may also provide additional network tunnels (not illustrated) linking additional subscriber switches together. These additional subscriber switches and additional network tunnels may be associated with a single enterprise or with a plurality of enterprises.

The network tunnel 114 is a logical path through the transport network comprising the transport switches, ports of the transport switches, and links connecting the transport switches. Although FIG. 1 depicts a single network tunnel, each transport switch and link may simultaneously accommodate a plurality of network tunnels.

Packets transmitted by subscriber switch 102 enter the network tunnel at port 116 of transport switch 108. The network tunnel relays these packets through transport switches 110 and 112 to port 118. The packets are then transmitted by port 118 to subscriber switch 104, thereby exiting the network tunnel.

Network tunnels generally have more than two endpoints. In such embodiments, packets sent to the network tunnel by a subscriber switch could be relayed to each of the endpoints of the network tunnel or to a subset of the endpoints of the network tunnel. The transport switches may decide which endpoints of a network tunnel having three or more endpoints receive a packet relayed by the network tunnel based on a destination address of the packet.

The transport switches logically separate each network tunnel from other network tunnels present in the transport network so that packets associated with one particular network tunnel are not accessible to subscriber switches that are not connected to the particular network tunnel.

The transport switches may logically separate packets into network tunnels by adding a tag associated with a network tunnel to each packet belonging to the network tunnel. The tag may be a Virtual Local Area Network (VLAN) tag, Multiprotocol Label Switching (MPLS) tag, or other tag. The transport switches may also use other methods of associating packets with a network tunnel. For example, each transport switch may use metadata associated with a packet, such as a port identifier associated with a port on which the packet was received, to associate the packet with the network tunnel.

The network tunnel may relay both data packets and control frames between subscriber switches. For example, if the subscriber switches are Ethernet switches, the subscriber switches may send Ethernet control frames to each other through the network tunnel such as Rapid Spanning Tree Protocol (RSTP) Bridge Protocol Data Units (BPDUs).

Each transport switch comprising the network tunnel may forward a control frame it receives that is not associated with the network tunnel to a control plane portion of the transport switch. The control plane examines the control frame and may perform a function associated with a request conveyed by the control frame in response to the examination. After performing the function, the control plane may discard the control frame rather than forward it on to another transport switch. For example, upon receiving and examining a flow control frame, the control plane may temporarily suspend transmitting packets out of one of the ports of the transport switch.

In contrast, if the control plane of the transport switch receives a control frame associated with a network tunnel, the control plane recognizes that the control frame is associated with the network tunnel. Accordingly, the control plane forwards the control frame either to the next transport switch associated with the network tunnel or to a destination subscriber switch rather than acting on the request conveyed by the control frame. Thus, forwarding control frames associated with the network tunnel to the control plane is unnecessary and in fact may introduce unwanted latency and jitter.

Accordingly, transport switches 108, 110, and 112 comprise a prevention application that prevents control frames associated with the network tunnel from being forwarded to a control plane of the transport switch for examination and processing. The prevention application may be implemented in a number of ways.

For example, in some embodiments each transport switch may comprise one or more processor(s) 124 and computer-readable media 126. The computer-readable media includes a prevention application 128 comprising a set of executable instructions that, when executed, prevent packets from being forwarded to a control plane. The processor(s) are capable of accessing and/or executing the computer-readable media.

Alternatively, the prevention application 128 may be implemented in one or more programmable logic devices, such as a Field Programmable Gate Array (FPGA). In this embodiment, the FPGA is capable of accessing and/or executing the computer-readable media, including the prevention application. In yet another alternative embodiment, the functionality of the prevention application may be implemented in one or more hardware devices, such as an application specific integrated circuit, within the transport switch.

Exemplary Embodiments for Preventing Forwarding of a Packet to a Control Plane

Figure 2:
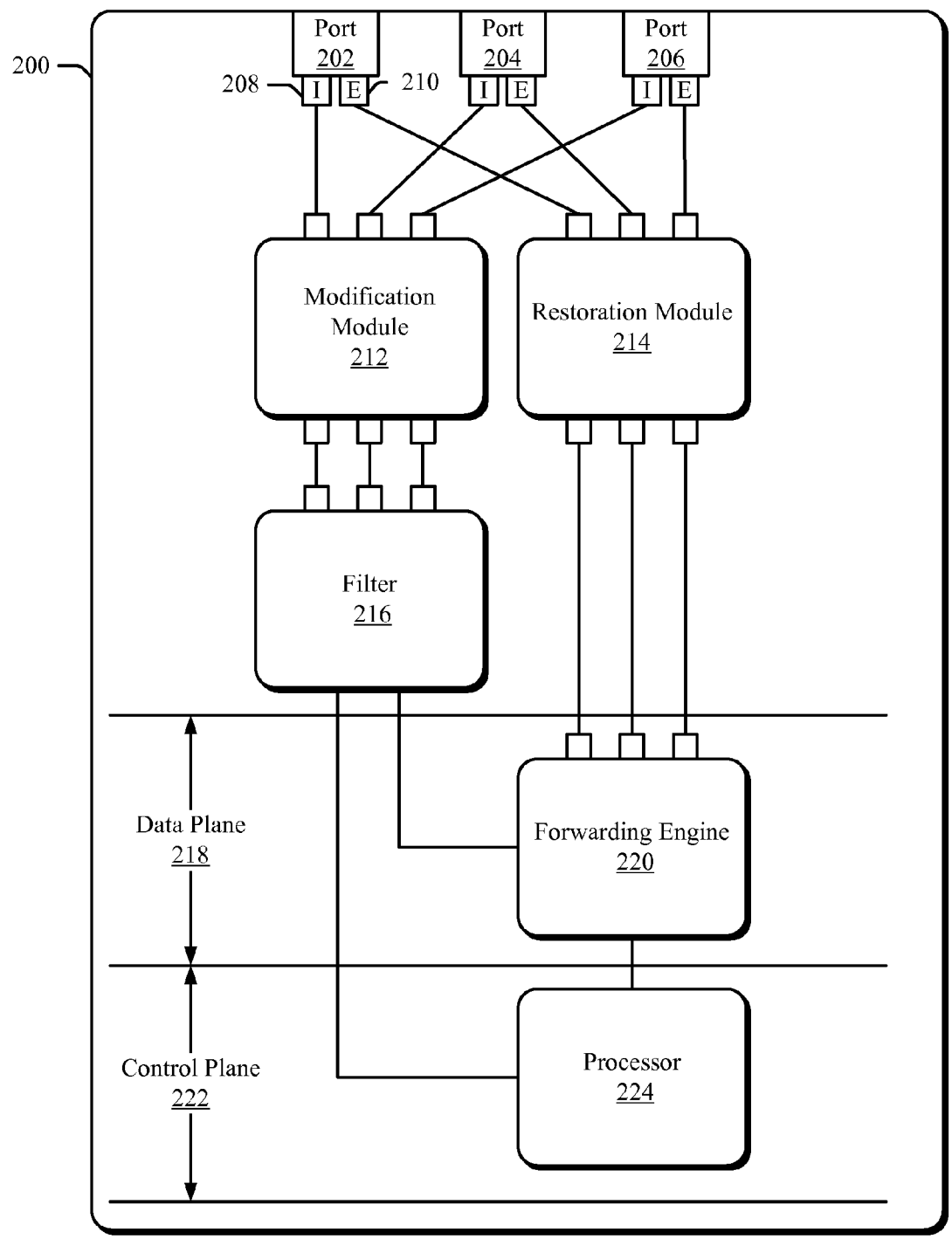
FIG. 2 is an exemplary system illustrating one embodiment of the tools capable of preventing a packet from being forwarded to a control plane.

FIG. 2 illustrates an exemplary packet switch 200 capable of preventing packets from being forwarded to a control plane of the packet switch. The packet switch may be used as one of the transport switches of FIG. 1. The packet switch 200 includes three ports 202, 204, 206; a modification module 212; a restoration module 214; a filter 216; a data plane 218; and a control plane 222.

Each port is logically depicted having an ingress interface 208 and an egress interface 210. The ingress interface relays packets ingressing the switch on the port to the modification module 212. The egress interface relays packets egressing the switch on the port from the restoration module 214 to the port.

The modification module 212 receives packets, including control frames, from the ingress interfaces of ports 202, 204, and 206. The modification module identifies which of the packets are control frames and determines for each control frame whether the control frame should be forwarded to the control plane. The modification module modifies those control frames that are to be prevented from going to the control plane to prevent the filter from forwarding the control frames to the control plane. The modification module then forwards the packets it receives to the filter 216.

Upon receiving a packet, the modification module determines whether the packet is a control frame by inspecting portions of the packet for indicia indicating that the packet is a control frame. Some packets are identifiable as control frames because they have a particular destination address. For example, Ethernet packets with a particular reserved multicast destination address are control frames. Similarly, Ethernet packets with a destination address of the switch 200 itself may also be control frames.

Other packets are identifiable as control frames because they have a particular bit sequence in a particular location within the packet. For example, a packet comprising a portion of an Internet Protocol (IP) header that indicates that the packet is an Internet Control Message Protocol (ICMP) packet may be a control frame. Some examples of Ethernet control frames that are identifiable by the indicia described above are flow control packets, bridge protocol data units used in spanning tree protocols, discovery protocols, and link aggregation protocols.

Once the modification module has identified control frames among the packets it receives, the modification module determines which of the control frames should be prevented from being forwarded to the control plane. In some cases, the modification module prevents control frames associated with a network tunnel from being forwarded to the control plane and allows control frames not associated with a network tunnel to be forwarded to the control plane.

The modification module may identify control frames as being associated with a network tunnel by determining that the control frames have a tag, such as a VLAN tag or MPLS tag. In one embodiment of the switch 200, substantially all of the packets received on a particular port may be associated with a particular network tunnel. In this embodiment, the modification module may identify control frames as being associated with a network tunnel based on the port on which the modification module receives the control frames.

In some embodiments of the modification module, the modification module does not determine whether a packet is a control packet. Instead, the modification module merely determines whether the packet is associated with a network tunnel. If the packet is associated with a network tunnel, the modification module identifies the packet as a packet that need not be forwarded to the control plane.

Once the modification module has identified packets that need not be forwarded to the control plane, the modification module modifies these packets to prevent the filter 216 from forwarding these packets to the control plane. The modifications performed by the modification module effectively negate or override the indicia present in these packets that indicate that the packets are in fact control frames.

In one embodiment, the modification module modifies the packets by changing the value of a "local bit" within the packet. The "local bit" is a particular bit within the packet that may be modified without affecting the way the packet switch forwards the packet to a destination port of the packet switch. The modification module changes the value of this bit from the bit's current value to the opposite value for control frames that are not to be forwarded to the control plane. For example, if the local bit is a zero, the modification module changes the bit to a one.

The filter 216, as described below, inspects the local bits of packets it receives and does not forward packets having a local bit set to one to the control plane. Consequently, control frames that enter the modification module having a local-bit value of zero are modified to have a local-bit value of one and therefore are not forwarded to the control plane by the filter.

In one embodiment, the packets are Ethernet control frames and the local bit is a particular bit within the destination address of the Ethernet control frame. In this embodiment, the position of the local bit is specified by the Institute of Electrical and Electronics Engineers (IEEE) 802 standard.

In another embodiment, the modification module may modify one or more overhead bits of control frames that are to be prevented from going to the control plane. For example, the modification module may replace the destination address of control frames that are identifiable as control frames because they have a reserved multicast destination address with a predetermined destination address that is not a multicast destination address. In this embodiment, the modification module may refer to a mapping when replacing the destination address. The mapping may specify a different predetermined destination address for each known reserved multicast destination address.

The filter, as described below, does not identify frames having the predetermined destination address as control frames and therefore does not forward these frames to the control plane. The restoration module, also described below, may later identify control frames having a predetermined destination address and replace the predetermined destination address with the reserved multicast destination address specified by the mapping, effectively restoring the destination address to its original state before forwarding these packets to a port.

Once the modification module has modified those control frames that need not be forwarded to the control plane, the modification module forwards the modified control frames to the filter. In addition, the modification module forwards all other packets that it receives from the ports to the filter, including control frames not requiring modification and packets that are not control frames.

The filter 216 receives packets from the modification module and determines, on a packet-by-packet basis whether to forward the packets to the control plane or the data plane. The filter is designed to forward packets having one or more indicia to the control plane and to forward packets that do not have the indicia to the data plane. In general, packets having one or more of the indicia are control frames.

The filter may look for the same indicia as the modification module in determining whether a packet is a control frame. These indicia, described above in relation to the modification module, include particular destination addresses and particular bit sequences located in a particular location within a packet. Once the filter has determined that a packet it has received is a control frame, based on the indicia, the filter forwards the packet to the control plane.

The filter may not determine whether a control frame is associated with a network tunnel before forwarding the control frame to the control plane. Instead, the filter forwards all packets that it determines are control frames to the control plane. However, when the filter examines a packet that has been modified (as described above) by the modification module, the filter determines that the modified packet is not a control frame even though it is in actuality a control frame associated with a network tunnel.

The filter does not classify the modified packet as a control frame to be sent to the control plane because the indicia the filter uses to classify packets as control frames have been negated in the modified packet by the modifications made by the modification module. Consequently, the filter does not send control frames associated with a network tunnel that have been modified by the modification module to the control plane.

For example, if the modification module replaces a reserved multicast destination address in a packet with a predetermined destination address, as described above, the filter may determine that the packet is not a control frame because the packet no longer has a reserved multicast destination address. Similarly, if the modification module sets a "local bit" within a packet, the filter may determine that the packet is not a control frame. This result is due to the fact that typical filters are designed to classify a packet having the "local bit" set as not "being control frame" even if the packet has other indicia that indicate to the filter that the packet is a control frame. In this manner, the set "local bit" overrides other indicia present in a packet.

The filter may be implemented in an application specific hardware device so that the filter may quickly determine whether each packet it receives should be forwarded to the control plane. Typically, the application specific hardware device is inflexible such that the indicia used to identify control frames are not alterable or are only minimally alterable. Consequently, the filter may not be altered to distinguish control frames associated with a network tunnel from control frames not associated with a network tunnel.

The control plane 222, as described above in relation to FIG. 2, examines packets it receives from the filter and may perform a function associated with a request conveyed by the packet it inspects. Typically, the control plane comprises a microprocessor 224, although the control plane could also be implemented in other ways as long as the control plane is capable of examining packets and performing functions associated with the packets it examines. Once the control plane has examined a packet, it may, based on the type of packet, discard the packet or forward the packet to the data plane 218.

In addition to examining packets received from the filter, the control plane may also perform management tasks associated with the switch 200 such as making configuration changes to the switch, reporting alarms or statistical data to a management system, and the like.

The data plane 218 may include a forwarding engine 220. The forwarding engine receives packets from the filter that the filter determines are not control frames. In addition, the forwarding engine receives packets that the filter classified as control frames from the control plane after the control plane has examined these control frames and determined that they should be forwarded to the data plane.

The forwarding engine may include a plurality of interfaces. After receiving a packet from either the filter or the control plane, the forwarding engine determines to which of its interfaces the packet should be forwarded. This interface is a destination interface for the packet. The forwarding engine then forwards the packet to the destination interface. The forwarding engine may determine the destination interface based on a destination address portion of the packet.

The forwarding engine is configured according to conventional knowledge to make its destination interface determination quickly so that the forwarding engine imposes minimal latency and jitter on packets that it forwards. The forwarding engine may comprise a switch, router, bridge, or other device capable of forwarding packets to a destination interface. In one embodiment, the forwarding engine and the filter are implemented in a single silicon switch chip.

Each forwarding engine interface is connected to one of a plurality of restoration module interfaces. The restoration module 214 receives packets from the forwarding engine interfaces on one of the restoration module interfaces. The restoration module ensures that packets that the switch transmits to other devices connected to one of the switch ports do not include modifications made by the modification module. The restoration module identifies which of the packets that it receives have been modified by the modification module and restores these packets to their original state by undoing the modification performed by the modification module.

The restoration module may identify packets to be restored by using substantially the same method used by the modification to identify packets to be modified. For example, if the modification module modifies packets having a reserved multicast address that are associated with a network tunnel, the restoration module may identify packets that have a modified local bit by identifying packets having a reserved multicast address that are associated with a network tunnel.

Once the restoration module has identified these packets, the restoration module may change the local bit of these packets from its current value to the opposite value. For example, if the local bit has a value of one, the restoration module changes the local bit to have a value of zero.

Similarly, the restoration module may restore packets that the modification module modified to have a different destination address. In this embodiment, the restoration module may use the mapping described above in relation to the modification module to identify packets having one of the predetermined destination addresses specified by the mapping. Once these packets have been identified, the restoration module modifies the packets to have the reserved multicast destination address associated with the predetermined destination address as described by the mapping.

In one embodiment, the modification module may add one or more bits to data packets that it modifies. The bits may indicate that the modification module has modified the packets in a particular way. Upon receiving packets having the additional bits, the restoration module may use the bits to identify the modification that the modification module made to the packets.

In some embodiments of the switch 200, the modifications made by the modification module need not be undone because the modifications are transparent or unknown to devices connected to the switch. In these embodiments, the switch does not include a restoration module and the interfaces of the forwarding engine are connected to ports 202, 204, and 206 rather than to a restoration module.

The modification module of FIG. 2 is placed inline between the ports and the filter and the restoration module is placed inline between the forwarding engine and the ports. This configuration, however, is merely exemplary. In some embodiments, the switch 200 may include some ports that are connected to the modification module and the restoration module and other ports that are connected directly to the filter and the forwarding engine. In these embodiments, control frames received on ports connected directly to the filter and the forwarding engine may not be prevented from being forwarded by the filter to the control plane.

Figure 3:
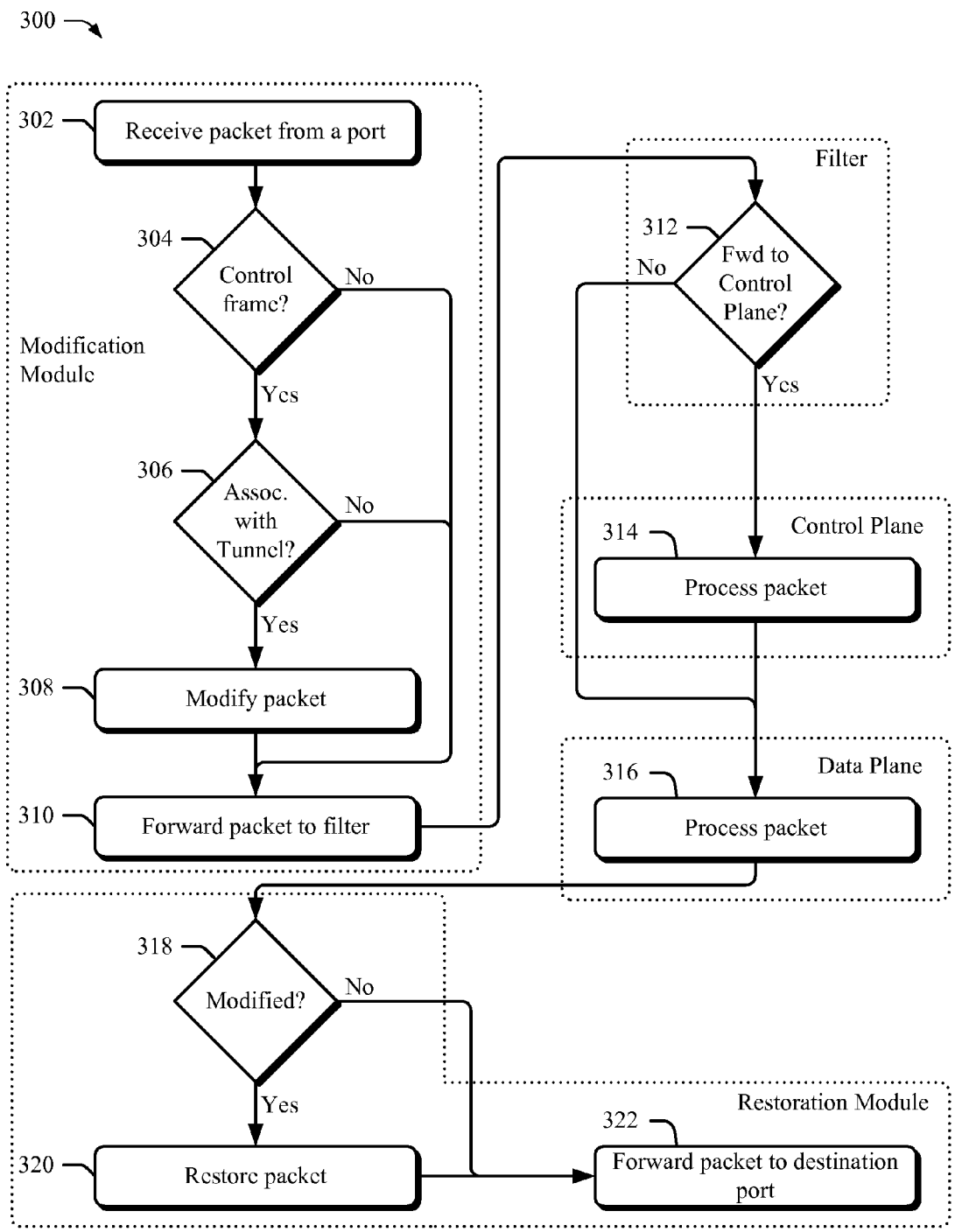
FIG. 3 illustrates an exemplary process for preventing a packet from being forwarded to a control plane.

FIG. 3 illustrates an exemplary process 300 for preventing a packet from being forwarded to a control plane used by the exemplary switch 200 of FIG. 2. At 302 the modification module 212 receives a packet from port 202, 204, or 206. The modification module then determines at 304 whether the packet is a control frame. If the packet is a control frame, the modification module determines at 306 whether the packet is associated with a network tunnel.

If the packet is associated with a network tunnel, the modification module modifies the packet, as described above, so that the filter does not send the packet to the control plane. The modification module then forwards the packet to the filter at 310. If the packet is not associated with a network tunnel, or the packet is not a control frame, the modification module forwards the packet to the filter at 310.

Once the filter receives the packet, the filter determines at 312 whether to forward the packet to the control plane based on indicia within the packet, as described above. If the packet is modified at 308, the filter will not forward the packet to the control plane. At 314, the control plane processes packets it receives from the filter in the manner described above in relation to FIG. 2 and then forwards the packets to the data plane if the packets are not terminated within the control plane.

At 316, the data plane processes packets it receives either from the control plane or from the filter by forwarding the packets through a destination interface to the restoration module. At 318, the restoration module determines whether a packet it receives was modified by the modification module. If the packet was modified, the restoration module restores the packet to its original state at 320 and then forwards the packet to a destination port at 322. If the packet was not modified by the modification module, the restoration module forwards the packet to a destination port at 322.

The switch 200 of FIG. 2 and the process 300 of FIG. 3 illustrate one approach to preventing a control frame associated with a network tunnel from being forwarded to a control plane of a switch. This switch and process minimize the latency and jitter experienced by a control frame as it is relayed by a network tunnel. Other approaches may also be used to prevent a control frame associated with a network tunnel from being forwarded to a control plane of a switch.

Figure 4:
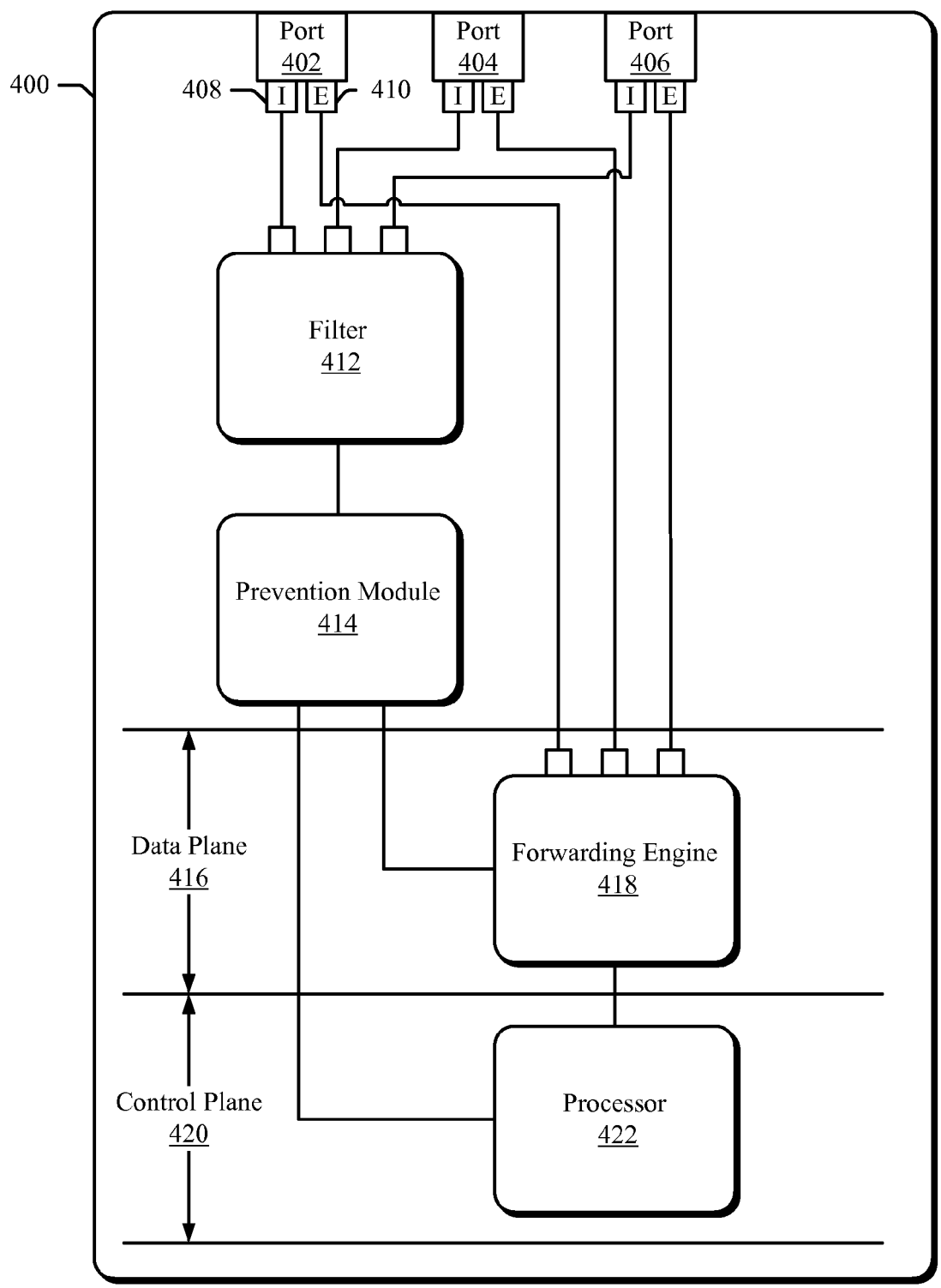
FIG. 4 is an exemplary system illustrating another embodiment of the tools capable of preventing a packet from being forwarded to a control plane.

FIG. 4 illustrates an exemplary switch 400 capable of preventing packets from being forwarded to a control plane of a switch. Switch 400 is similar to switch 200 of FIG. 2 in that it comprises three ports 402, 404, 406, each with an ingress interface 408 and an egress interface 410; a filter 412; a data plane 416 comprising a forwarding engine 418; and a control plane 420 comprising a microprocessor 422. Switch 400 differs from switch 200 in that switch 400 includes a prevention module 414 and does not include a modification module or a restoration module.

The ingress interfaces of each of the ports are connected to the filter and the egress interfaces of each of the ports are connected to the forwarding engine. The filter operates in a substantially similar manner as filter 216 of switch 200. The filter identifies packets that comprise one or more indicia as control frames to be forwarded to the control plane and forwards the control frames to the prevention module. The filter forwards packets that it determines are not control frames to the forwarding engine.

The prevention module receives packets that the filter determines are control frames to be forwarded to the control plane. Rather than merely forwarding these control frames to the control plane, the prevention module inspects each of the control frames. If the prevention module determines that one of the control frames need not be forwarded to the control plane, the prevention module forwards the control frame to the forwarding engine. If the prevention module determines that one of the control frames should be forwarded to the control plane, it forwards the control frame to the control plane.

One criterion that the prevention module may use to determine whether a control frame should be forwarded to the forwarding engine rather than the control plane is whether the control frame is associated with a network tunnel. The prevention module may forward control frames associated with a network tunnel to the forwarding engine rather than the control plane, thereby minimizing the latency and jitter experienced by these control frames. In this manner, the prevention module prevents control frames associated with a network tunnel from being forwarded to the control plane without having to modify the control frames.

Figure 5:
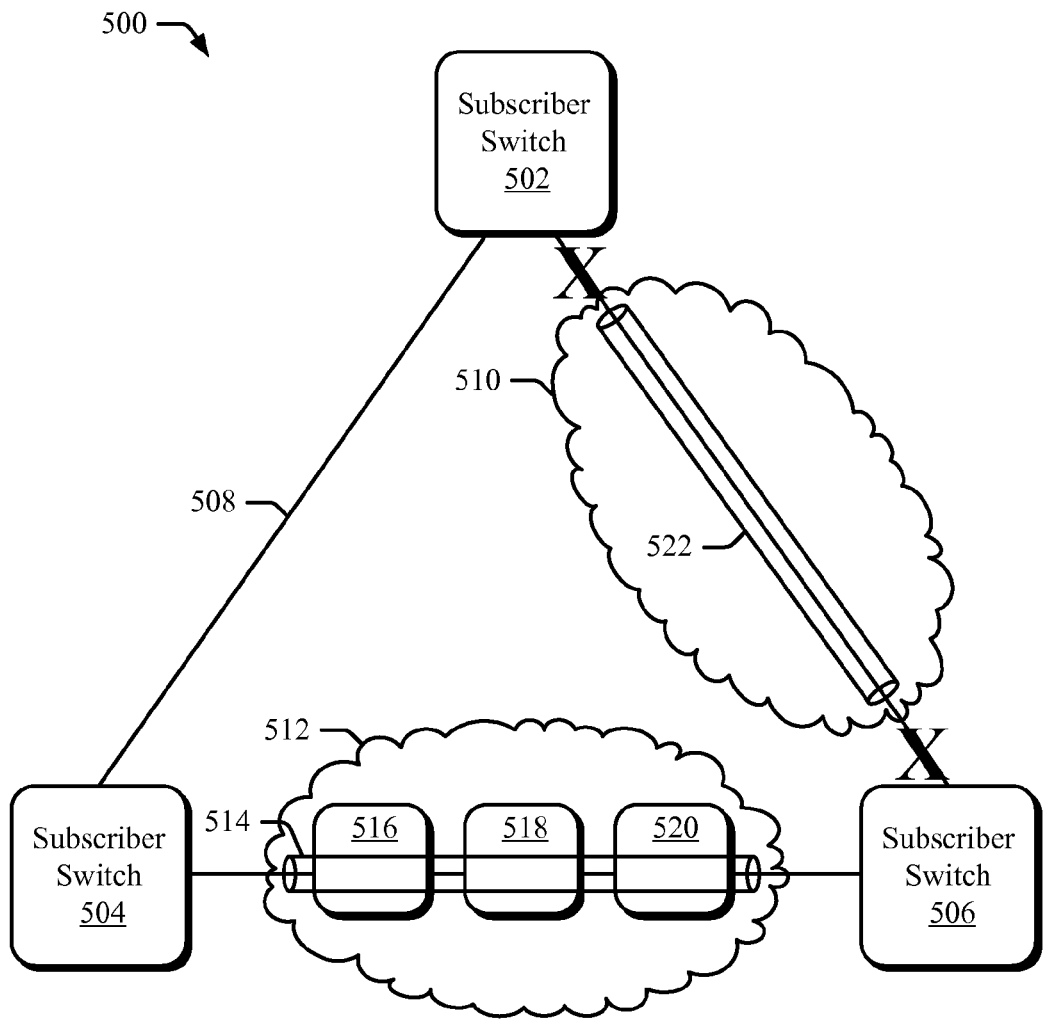
FIG. 5 illustrates an exemplary system in which the tools may operate to relay control frames through a network tunnel in a first exemplary configuration.

As has been described above, preventing control frames associated with a network tunnel from being forwarded to a control plane of a switch is advantageous because it minimizes the latency and jitter experienced by control frames associated with a network tunnel as they are relayed by the network tunnel. FIG. 5 depicts a system 500 that illustrates the advantages of minimizing latency and jitter.

The system 500 includes three subscriber switches 502, 504, 506; a first transport network 510; and a second transport network 512. The first transport network 510 provides a network tunnel 522 connecting subscriber switch 502 and subscriber switch 506 and the second transport network 512 provides a network tunnel 514 connecting subscriber switch 504 and subscriber switch 506. Transport network 512 comprises three connected transport switches 516, 518, 520. Transport network 510 also comprises one or more transport switches, but for simplicity, the transport switches are not illustrated.

Subscriber switches 502 and 504 are connected by link 508. In this exemplary configuration, subscriber switches 502 and 504 are physically located near enough to each other that they can be connected via a link, such as a copper or fiber cable, owned by the enterprise that operates the three subscriber switches. Subscriber switch 506, on the other hand, is physically located such that the enterprise cannot economically connect subscriber switch 506 with subscriber switches 502 and 504 using a cable owned by the enterprise. Accordingly, the enterprise leases network tunnel 514 from a service provider to connect subscriber switch 504 with subscriber switch 506 and leases network tunnel 522 from the same service provider or a different service provider to connect subscriber switch 502 with subscriber switch 506.

The subscriber switches in this exemplary embodiment communicate with each other via Ethernet packets. The system 500 provides link redundancy since each subscriber switch may communicate with each of the other subscriber switches via two distinct paths. For example, subscriber switch 502 may send packets to subscriber switch 504 directly via link 508 or indirectly via network tunnel 522, subscriber switch 506, and network tunnel 514. The enterprise may choose to lease both network tunnels, even though only one of the network tunnels is required to provide connectivity between the three subscriber switches, because communication between the subscriber switches may be critical to the operation of the enterprise.

The redundancy provided by the two network tunnels may be useful if link 508 or one of the network tunnels becomes inoperative. However, Ethernet switches connected in a loop, like the exemplary system 500, are susceptible to broadcast storms. Consequently, the exemplary system may use a broadcast storm prevention protocol, such as the IEEE 802.1D Spanning Tree Protocol, IEEE 802.1w Rapid Spanning Tree Protocol, IEEE 802.1s Multiple Spanning Tree Protocol, or another protocol capable of preventing broadcast storms in systems having loops.

Such protocols may involve the subscriber switches sending BPDUs to each other to keep each other informed regarding the status of the link and the network tunnels. As was discussed above, BPDUs are a particular type of control frame. As a result of receiving BPDUs from subscriber switches 504 and 506, subscriber switch 502, in the exemplary system, has blocked its port that is connected to network tunnel 522. Similarly, subscriber switch 506 has blocked its port that is connected to network tunnel 522 as a result of receiving BPDUs from subscriber switches 502 and 504. These two blocked ports are depicted in FIG. 5 with a large "X."

The blocked ports are configured so that they do not transmit broadcast packets, thereby preventing broadcast storms in the network. The blocked ports may continue to transmit BPDUs on network tunnel 522, however. BPDUs may be sent by each of the three subscriber switches to let the subscriber switches know of changes in the status of link 508, network tunnel 514, or network tunnel 522. In response to receiving a BPDU indicating a change in link status, the subscriber switches may act to reconfigure the state of their ports to ensure continued connectivity between the subscriber switches.

Figure 6:
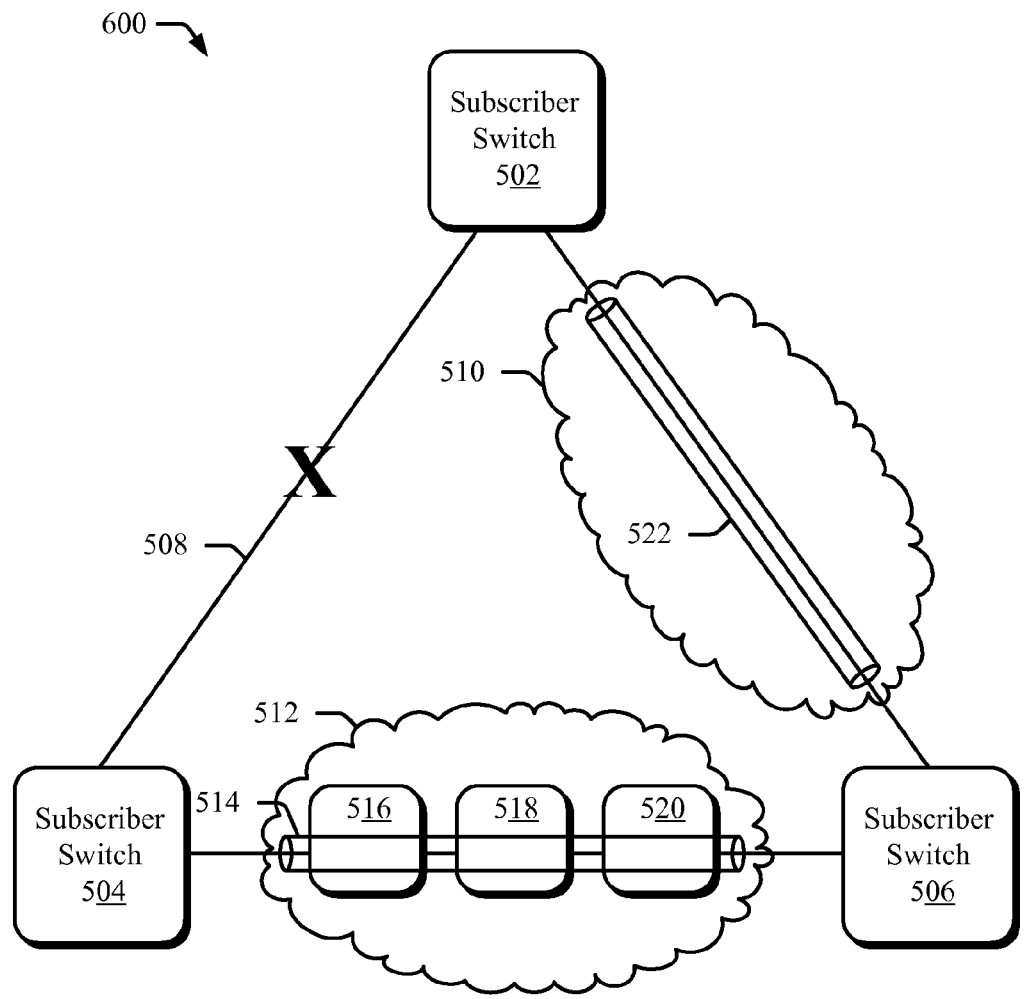
FIG. 6 illustrates an exemplary system in which the tools may operate to relay control frames through a network tunnel in a second exemplary configuration.

FIG. 6 illustrates the effect on system 500 of a change in the status of link 508. In FIG. 6, link 508 is no longer operational due to a severed cable. Subscriber switches 502 and 504 may both detect that link 508 is down and, as a result, may each immediately send a BPDU to subscriber switch 506. Consequently, subscriber switch 506 unblocks its port connected to network tunnel 522.

Similarly, subscriber switch 502 unblocks its port connected to network tunnel 522 making communication possible between subscriber switches 502 and 506 via network tunnel 522. Although link 508 is down, subscriber switches 502 and 504 may still communicate with each other via network tunnel 522, subscriber switch 506, and network tunnel 514.

To minimize the delay between the time that link 508 fails and the time that subscriber switches 502 and 506 unblock their ports, making network tunnel 522 operational, BPDUs need to travel between the subscriber switches quickly. In the exemplary systems of FIGS. 5 and 6, network tunnels 514 and 522 are facilitated by transport switches capable of preventing control frames associated with a network tunnel from being forwarded to a control plane of the transport switch.

For example, BPDUs sent from subscriber switch 504 to subscriber switch 506 via network tunnel 514 are not forwarded to the control planes of transport switches 516, 518, or 520. Instead, the transport switches forward the BPDUs to their data planes, minimizing the latency introduced by each transport switch.

Consequently, BPDUs are relayed more quickly between subscriber switches than if the BPDUs had been forwarded to the control planes of each of the transport switches they encountered in either transport network 512 or 510. As a result, the amount of time during which link 508 is down and network tunnel 522 is not yet operational is decreased.

Of course, there may be control frames sent by one of the subscriber switches that are forwarded to the control plane of one of the transport switches. For example, subscriber switch 504 may send a flow control packet to transport switch 516 requesting that transport switch 516 temporarily stop sending packets to subscriber switch 504 in order for subscriber switch 504 to deal with a receive queue that is full or nearly full of packets received from transport switch 516.

In this case, subscriber switch 504 may ensure that the flow control packet is not associated with network tunnel 514 or alternatively, transport switch 516 may ensure that the flow control packet is not associated with network tunnel 514. Consequently, since the flow control packet is not associated with network tunnel 514, transport switch 516 may send the flow control packet to its control plane for processing. The control plane may recognize the flow control packet and take action by configuring the port of transport switch 516 connected to subscriber switch 504 to temporarily stop transmitting packets to subscriber switch 504.

Other Embodiments of the Tools

Figure 7:
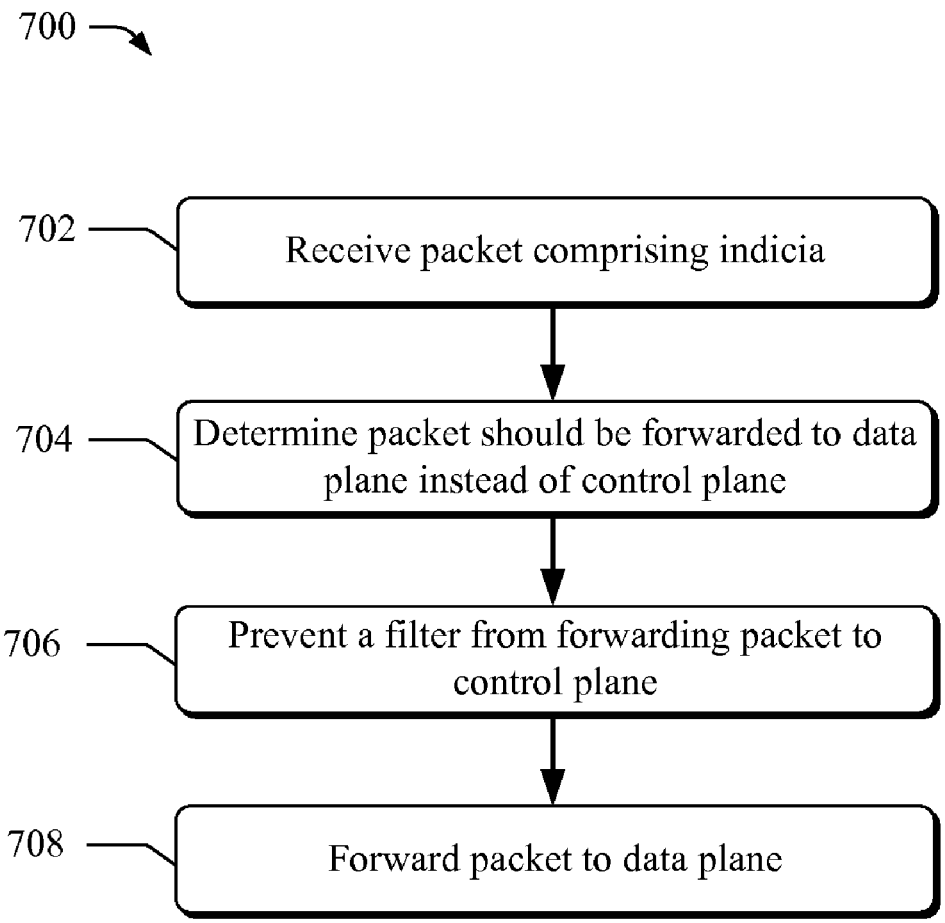
FIG. 7 is an exemplary process illustrating various embodiments and manners in which the tools determine whether a packet should be forwarded to a data plane of a packet switch instead of a control plane of the packet switch.

The section above describes exemplary ways in which the tools prevent the forwarding of a packet to a control plane of a packet switch. The section below describes additional embodiments of the tools, including processes. Each of the processes below may be performed through computer-executable instructions on computer-readable media, hardware, a combination of both, or otherwise. FIG. 7 illustrates a process 700 as a series of blocks representing individual operations or acts performed by the tools.

At block 702, the tools receive a packet comprising one or more indicia recognizable by a filter of a packet switch. The filter is configured, upon recognizing the indicia, to forward the packet to a control plane of the packet switch. The indicia may comprise, as is described above, one or more bit patterns located within one or more particular positions of the packet. The bit patterns and positions may be defined by a user as long as the bit patterns and positions are known to the filter.

As described above in relation to FIGS. 1-2, the packet may be a well-known control frame, such as a BPDU. The packet, however, need not be a well-known control frame as long as the packet comprises indicia recognizable by the filter. For example, packets comprising an IGMP join or leave message, packets addressed to a particular layer-four port, and packets having a particular layer-three message type may each have indicia recognizable by the filter.

At block 704, the tools determine the packet should be forwarded to a data plane of the packet switch instead of the control plane, despite the indicia. As is described above in relation to FIG. 2, the tools may determine that packets associated with a network tunnel should be forwarded to the data plane instead of the control plane. The tools may also use other criteria in deciding whether to forward packets to the data plane instead of the control plane.

For example, the tools may determine that packets comprising a particular control frame type, for example discovery protocol BPDUs, should be forwarded to the data plane instead of the control plane whether or not they are associated with a network tunnel. This criterion may be desirable to an operator of a transport network who does not want a subscriber switch to obtain information about a transport switch via a discovery protocol BPDU.

Another embodiment of the tools may specify that packets comprising an IGMP message should be forwarded to the data plane instead of the control plane whether or not they are associated with a network tunnel. This criterion may be desirable if a transport switch is not capable of processing IGMP messages, or is merely configured not to process IGMP messages, but the operator of the transport switch wants to minimize the latency and jitter imposed on IGMP packets relayed by the transport switch.

At block 706, the tools prevent the filter from forwarding the packet to the control plane. As was discussed above in relation to FIG. 2, the tools may modify the packet so that the indicia of the packet are overridden or negated. The tools may instead intercept the packet after the filter forwards the packet to the control plane but before the control plane receives the packet, as was described above in relation to FIG. 4.

Other methods of preventing the packet from reaching the control plane may also be employed. For example, in some embodiments, the tools may forward the packet directly to the data plane, bypassing the filter so that the filter does not inspect the packet.

At block 708, the tools forward the packet to the data plane. As was discussed above in relation to FIG. 2, the tools may forward the packet to the data plane indirectly through the filter. The tools may instead forward the packet directly to the data plane as was discussed above in relation to FIG. 4.

Figure 8:
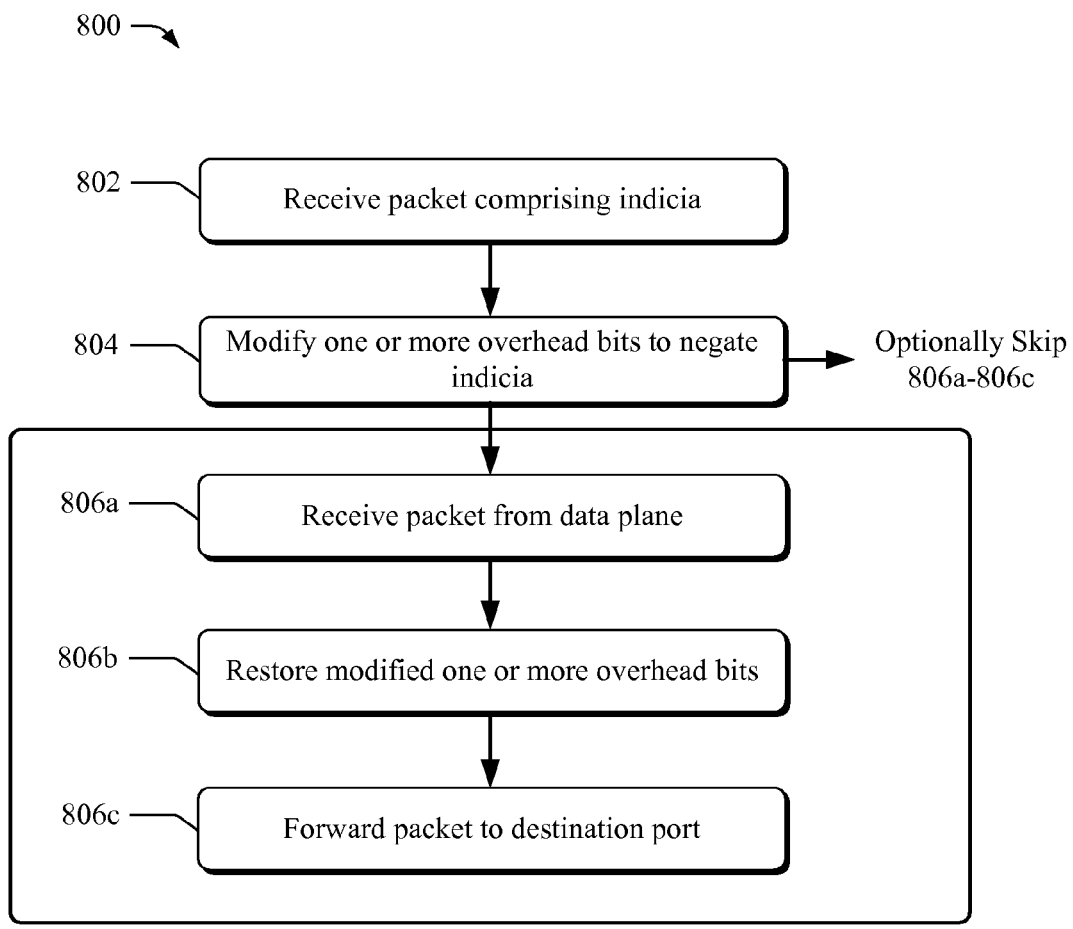
FIG. 8 is an exemplary process illustrating various embodiments and manners in which the tools modify one or more overhead bits of a packet to prevent the packet from being forwarded to a control plane of a packet switch.

FIG. 8 illustrates another embodiment of the tools as method 800, which is illustrated as a series of blocks representing individual operations or acts performed by the tools. At block 802, the tools receive a packet comprising one or more indicia recognizable by a filter of a packet switch. The filter is configured, upon recognizing the indicia, to forward the packet to a control plane of the packet switch.

Block 802 is similar to block 702 described above in that the indicia may comprise one or more bit patterns located within one or more particular positions of the packet. The bit patterns and positions may be defined by a user as long as the bit patterns and positions are known to the filter.

As described above in relation to FIGS. 1-2, the packet may be a well-known control frame, such as a BPDU. The packet, however, need not be a well-known control frame as long as the packet comprises indicia recognized by the filter. For example, packets comprising an IGMP join or leave message, packets addressed to a particular layer-four port, and packets having a particular layer-three message type may each have indicia recognizable by the filter.

At block 804, the tools modify one or more overhead bits of the packet effective to negate the indicia. The modification prevents the filter from forwarding the packet to the control plane. As was described above in relation to FIG. 2, the tools may modify the packet by setting a "local bit" within a destination address of the packet or may replace the destination address of the packet with a predetermined destination address. The tools may also use other methods of modifying the packet that are compatible with the filter as long as the modification prevents the filter from forwarding the data packet to the control plane.

The tools may optionally perform additional functions. At block 806a, the tools may receive the data packet modified at block 804 from a data plane. The data plane may comprise a forwarding engine like the data plane described above in relation to FIG. 2. The data plane may instead comprise a switch chip or other device capable of forwarding packets to a destination port.

At block 806b, the tools may restore the modified one or more overhead bits that were modified in block 804. The tools may clear the "local bit" or replace the predetermined destination address with the original destination address as is described above in relation to FIG. 2. At block 806c, the tools may forward the restored packet to a destination port.

Figure 9:
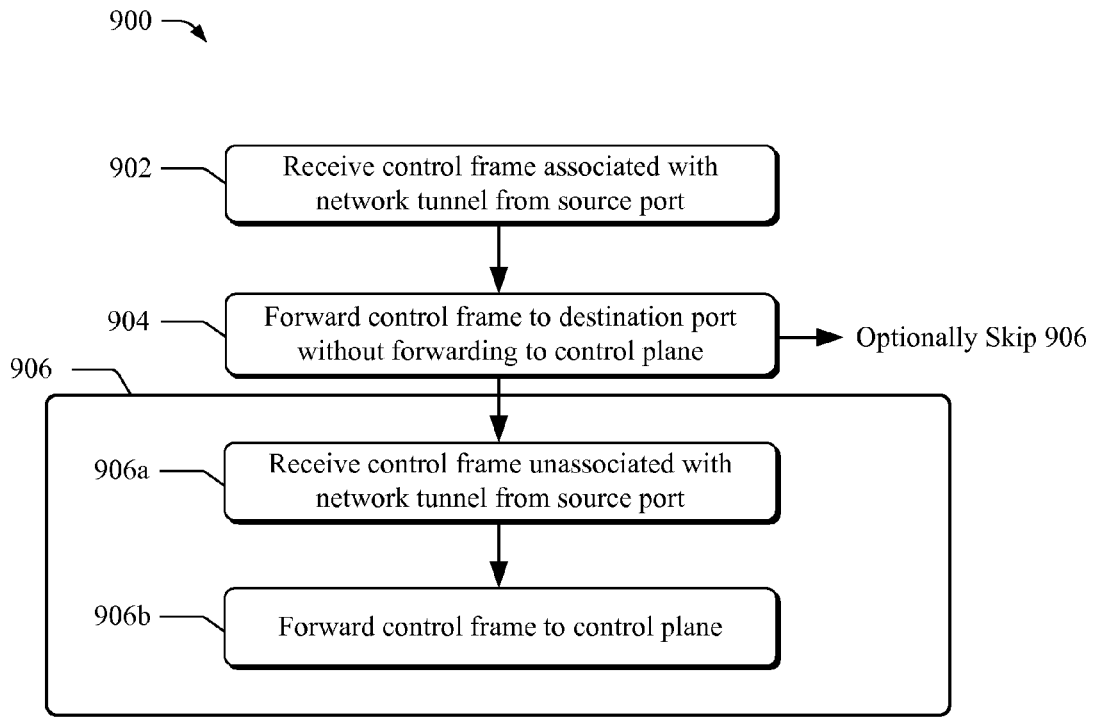
FIG. 9 is an exemplary process illustrating various embodiments and manners in which the tools forward a control frame from a source port of a packet switch to a destination port of a packet switch without forwarding the control frame to a control plane of the packet switch.

FIG. 9 illustrates another embodiment of the tools as method 900, which is illustrated as a series of blocks representing individual operations or acts performed by the tools. At block 902, the tools receive a control frame addressed to the packet switch from a source port of a packet switch. Some control frames may have a destination address that addresses the control frame directly to the packet switch. For example, the destination address of the control frame may match an address of the packet switch. Other control frames may address the packet switch via a broadcast destination address or a multicast destination address.

The control frame comprises either a network status message or a request that the packet switch make a behavior change. The control frame is associated with a network tunnel configured to relay the control frame from one location to another location via the packet switch.

The control frame may be a layer-two control frame such as the Ethernet BPDU described above in relation to FIGS. 5-6. The control frame may also be a control frame associated with a higher layer, such as a layer-three IP control frame. In one embodiment, the network tunnel may comprise a VLAN. The network tunnel may also comprise an MPLS label switched path or an MPLS tunnel.

At block 904, the tools forward the control frame from the source port to a destination port of the packet switch without forwarding the control frame to a control plane of the packet switch. Some embodiments of the packet switch may include a filter, similar to the filter described above in relation to FIGS. 2-3. As was discussed above in relation to FIG. 2, the tools may forward the packet to the data plane indirectly through the filter. The tools may also forward the packet directly to the data plane as was discussed above in relation to FIG. 4.

Other embodiments of the packet switch may not include the filter described above in relation to FIGS. 2-3. In these embodiments, the tools may replace the functionality of the filter by receiving a packet from a port and then forwarding the packet either directly to a data plane or directly to a control plane.

Conclusion

The above-described tools prevent a packet from being forwarded to a control plane of a packet switch. The tools significantly decrease the latency and jitter associated with relaying a control frame from one location to another location through a network tunnel. By so doing, the tools allow the use of time sensitive protocols, such as IEEE 802.1w Rapid Spanning Tree Protocol, by devices connected by the network tunnel.

Although the tools have been described in language specific to structural features and/or methodological acts, it is to be understood that the tools defined in the appended claims are not necessarily limited to the specific features or acts described. Rather, the specific features and acts are disclosed as exemplary forms of implementing the tools.

The invention claimed is:

1. A packet switch operating method comprising: a packet switch receiving a packet comprising one or more indicia recognizable by a filter of the packet switch, the indicia being capable of causing the filter, upon recognizing the indicia, to forward the packet to a control plane of the packet switch;

the packet switch determining that the packet should be forwarded to a data plane of the packet switch instead of the control plane, despite the indicia;

the packet switch preventing the filter from forwarding the packet to the control plane by modifying the packet effective to negate the indicia; and the packet switch forwarding the packet to the data plane;

wherein the modifying of the packet comprises modifying the packet a first time and further comprising after the forwarding of the packet to the data plane, modifying the packet a second time.

2. The method of claim 1 wherein the packet prior to the modifying of the packet the first time is identical to the packet after the modifying of the packet the second time.

3. The method of claim 1 wherein the determining that the packet should be forwarded to the data plane of the packet switch comprises determining the packet is associated with a network tunnel configured to relay packets containing the indicia from one location to another location via the packet switch.

4. The method of claim 3 wherein the determining the packet is associated with the network tunnel comprises examining a tag of the packet or comparing a port of the packet switch that the packet is received on with a configuration.

5. The method of claim 1 wherein the data plane comprises a forwarding engine configured to receive the packet, determine a destination port for the packet, and forward the packet to the destination port.

6. The method of claim 1 wherein the forwarding of the packet to the data plane comprises forwarding the packet to the data plane via the filter.

7. The method of claim 1 wherein the packet comprises a reserved multicast destination address.

8. The method of claim 1 wherein the packet comprises an Ethernet destination address and the Ethernet destination address is an address of the packet switch.

9. The method of claim 1 wherein the packet comprises an Ethernet control frame.

10. The method of claim 1 wherein the modifying of the packet comprises modifying an Ethernet destination address of the packet.

11. A packet switch comprising:
    a plurality of ports;
    a data plane configured to forward packets received by the data plane;
    a filter connected to the data plane; a control plane connected to the data plane; modification circuitry connected to the filter and configured to:
    receive a packet from one of the plurality of ports, the packet comprising one or more indicia recognizable by the filter, the indicia being capable of causing the filter, upon recognizing the indicia, to forward the packet to the control plane;
    first modify the packet effective to negate the indicia;
    forward the first modified packet to the filter;
    receive the first modified packet from the data plane;
    second modify the packet; and
    forward the second modified packet to one of the plurality of ports.

12. The packet switch of claim 11 wherein the first modifying of the packet comprises modifying an Ethernet destination address of the packet.

13. The packet switch of claim 11 wherein the packet prior to the first modifying of the packet is identical to the packet after the second modifying of the packet.

* * * * *